Oct. 29, 1929.  F. V. DETWILER  1,733,450
COOKING UTENSIL
Filed Nov. 19, 1928
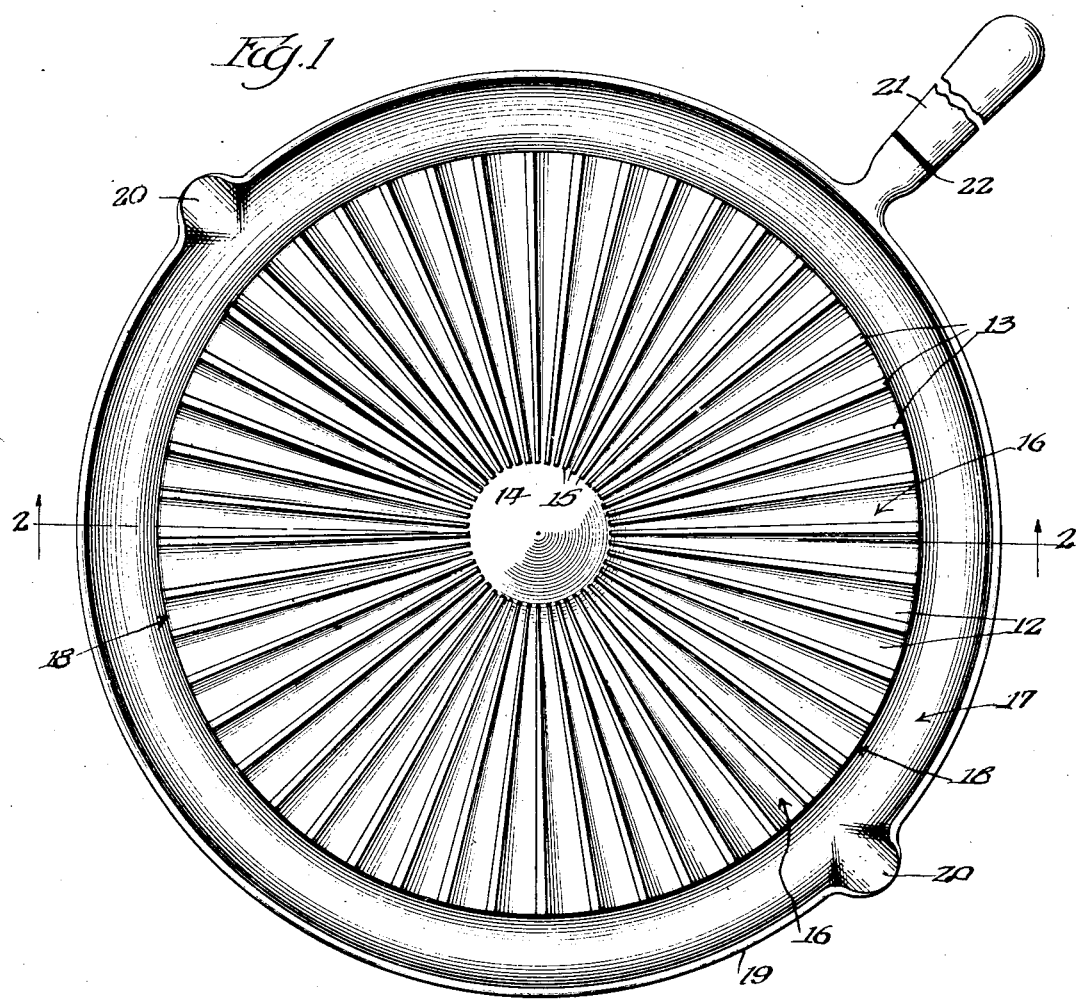
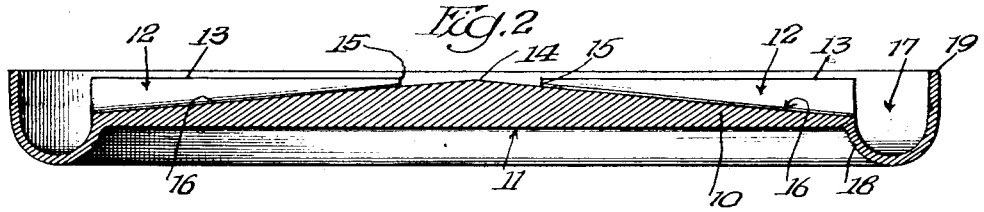
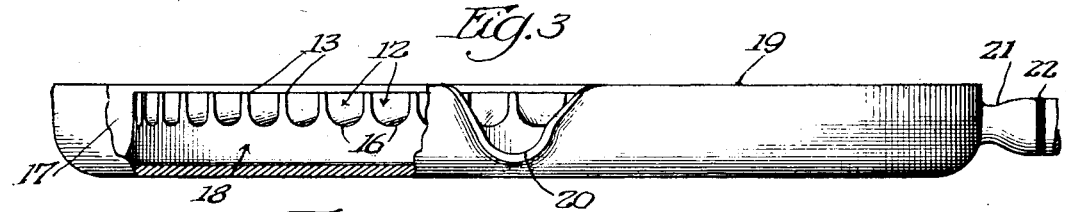
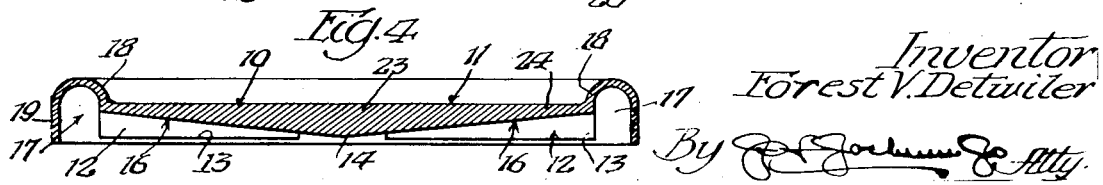
Inventor
Forest V. Detwiler
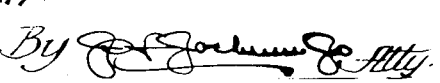

Patented Oct. 29, 1929

1,733,450

UNITED STATES PATENT OFFICE

FOREST V. DETWILER, OF CHICAGO, ILLINOIS

COOKING UTENSIL

Application filed November 19, 1928. Serial No. 320,307.

This invention relates to improvements in cooking utensils, and one of the objects of the same is to provide an improved utensil of this character, one side of which is adapted to be used as a griddle, the other side being adapted for use as a broiler, the latter side being provided with grooves, channels or the like for the reception of juices which drop from the article being cooked thereon, the bottoms of the grooves or channels being inclined from one end toward the other end for causing the juices to flow into and accumulate in a peripheral trough or chamber.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a top plan view of a utensil of this character constructed in accordance with the principles of this invention.

Figure 2 is a sectional view taken on line 2—2, Figure 1.

Figure 3 is a side elevation of Figure 1, partly broken away.

Figure 4 is a view similar to Figure 2, showing the utensil inverted.

The utensil consists essentially of a body portion 10 which may be formed in any desired or suitable manner and of any suitable material, but is preferably formed by casting or molding the same. One surface 11 of the body is flat and provided in the upper surface are a plurality of grooves or channels 12 which may be formed in any desired or suitable manner so as to produce ribs 13. The ribs 13 terminate short of the diametric center 14 of the body as at 15, and the bottoms 16 of the grooves or channels incline downwardly and outwardly. The upper edges of the ribs 13 are substantially in alinement with the diametric center of the body portion 10.

The circumference of the body portion 10 is shaped to form an upwardly opening peripheral channel 17, a portion 18 of the wall of the channel extending beyond the surface 11 of the body 10 while the edge 19 of the outer wall of the channel extends to a point above the tops of the ribs 13 and of the diametric center 14 of the body 10.

The grooves or channels 12 have communication with the chamber or channel 17 so that any liquid which enters the grooves or channels will, by reason of the downwardly inclined bottoms 16 thereof, be discharged into and will accumulate within the channel or chamber 17.

Spouts 20 may be provided in the outer wall 19 of the channel 17 by means of which the liquid may be poured from the channel and a suitable handle 21 is connected with the body portion and insulated therefrom by means of suitable insulation 22.

With this construction it will be manifest that when an article, such as meat, is placed upon the griddle and the griddle being disposed above a flame or a suitable source of heat, the article will be held out of contact with the bottoms 16 of the grooves or channels 12 so that any juice dropping during the cooking operation will flow through the grooves or channels 12 into the channel or chamber 17.

This construction is particularly advantageous by reason of the fact that the article can be cooked or broiled without being maintained or confined during the cooking operation within a quantity of grease or fat which accumulates in the cooking utensil of the ordinary construction, as the juices and fats will be conveyed away.

When it is desired to use the utensil as a griddle, it may be reversed or inverted from the position shown in Figure 2 to the position shown in Figure 4 so that the surface 11 will be uppermost, in which event the portion 18 of the circumferential flange will project above the surface 11 to prevent the material being cooked from running off of the griddle, such for instance as "batter".

When the device is used as a griddle, and in the position shown in Figure 4, it will be noted that by reason of the grooves or channels 12 and the inclined bottoms 16 of the channels, the body portion 10 will be of a varying thickness. That is to say the central portion 23 will be of considerable thickness and by reason of the grooves or channels 12 will taper or be gradually reduced in thickness as at 24 toward the periphery of the surface 11.

This is particularly advantageous by reason of the fact that when the utensil is employed in the position shown in Figure 4 and heat is supplied, the heat will accumulate in the thickened portion 23 and when the supply of heat is reduced, the heat accumulated in the central portion of the body will radiate towards the periphery thereof, with the result that the surface 11 will be of a substantially uniform degree of heat throughout substantially the entire area thereof.

At the same time when the heat is applied, the products of combustion and heated air will, by reason of the inclined bottoms 16 of the grooves or channels 12 be directed toward the periphery of the surface 11.

The outer wall 19 of the groove or channel 17 will also serve as a flange for preventing the escape of heat around the outside of the body portion.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A cooking utensil embodying a body having two opposite faces either of which may be used as a cooking surface, said body decreasing in thickness from the center towards the periphery thereof, one of said surfaces having grooves or channels extending in directions from the center towards the periphery thereof.

2. A cooking utensil embodying a body having two opposite faces either of which may be used as a cooking surface, said body decreasing in thickness from the center towards the periphery thereof, one of said surfaces having grooves or channels extending in directions from the center towards the periphery thereof, the bottom of said grooves or channels inclining downwardly towards the periphery of the body.

3. A cooking utensil embodying a body having two opposite faces either of which may be used as a cooking surface, said body decreasing in thickness from the center towards the periphery thereof, one of said surfaces having grooves or channels extending in directions from the center towards the periphery thereof, and a circumferential trough with which said channels communicate.

4. A cooking utensil embodying a body having two opposite faces either of which may be used as a cooking surface, said body decreasing in thickness from the center towards the periphery thereof, one of said surfaces having grooves or channels extending in directions from the center towards the periphery thereof, and a circumferential trough with which the said chambers communicate, one of the walls of the trough extending to a plane beyond the plane of said grooved or channeled surface.

5. A cooking utensil embodying a body having two opposite faces either of which may be used as a cooking surface, said body decreasing in thickness from the center towards the periphery thereof, one of said surfaces having grooves or channels extending in directions from the center towards the periphery thereof, the walls of the channels being continuous throughout the length of the channels, the bottoms of said grooves or channels inclining downwardly towards the periphery of the body, and a circumferential trough with which the said channels communicate, all of said parts being formed as an intergral structure.

6. A cooking utensil embodying a body having two opposite faces either of which may be used as a cooking surface, one of said surfaces having grooves or channels opening therethrough, the channel walls being continuous throughout the length of the channel with their upper edges in the same plane, a circumferential trough with which said grooves or channels communicate, the other of said surfaces being smooth and substantially flat, one wall of said trough being shaped to form an upstanding projection extending above and about the said flat surface when the latter is uppermost.

7. A cooking utensil embodying a body having two opposite faces either of which may be used as a cooking surface, one of said surfaces having grooves or channels opening therethrough, a circumferential trough with which said grooves or channels communicate, the other of said surfaces being smooth and substantially flat, one wall of said trough being shaped to form an upstanding projection extending above and about the said flat surface when the latter is uppermost, the other wall of said trough depending below the said grooved or channeled surface when the latter is lowermost and operation to confine the products of combustion within the flange.

8. A cooking utensil embodying a body portion having two opposite faces either of which may be placed uppermost and utilized for cooking purposes, grooves or channels in one of said faces, a circumferential trough into which the said grooves or channels communicate, the grooves or channels increasing in depth towards the said trough whereby the thickness of the said body portion will decrease from the center thereof outwardly.

9. A cooking utensil embodying a body portion having two opposite faces either of which may be placed uppermost and utilized for cooking purposes, grooves or channels in one of said faces, a circumferential trough into which the said grooves or channels communicate, the grooves or channels increasing in depth towards the said trough whereby the thickness of the said body portion will decrease from the center thereof outwardly, the upper surfaces of the walls of the grooves or channels being in the same plane with each other and with the central portion of the respective surface of the body.

10. A cooking utensil embodying a body portion provided with a cooking surface, grooves or channels opening through said surface, and a circumferential trough adjacent the periphery of the body and with which trough said grooves or channels communicate, said grooves or channels increasing in depth in directions from the center of said body outwardly.

11. A cooking utensil embodying a body portion either face of which may be used uppermost and upon either face an article may be cooked, a circumferential flange extending beyond both faces of the body, one of said faces being flat, the other face being provided with grooves increasing in depth from the center of the body towards the periphery thereof to form spaced continuous supporting walls, all of the walls terminating short of the center of the body to form a space with which all of said grooves have communication.

In testimony whereof I have signed my name to this specification on this 28th day of August, A. D., 1927.

FOREST V. DETWILER.